April 14, 1931.  F. G. SLAGEL  1,800,846
HUMIDIFIER FOR REFRIGERATORS
Filed March 27, 1930  2 Sheets-Sheet 1

Inventor
Franklin G. Slagel
By Popp & Powers
Attorneys

April 14, 1931. F. G. SLAGEL 1,800,846
HUMIDIFIER FOR REFRIGERATORS
Filed March 27, 1930    2 Sheets-Sheet 2
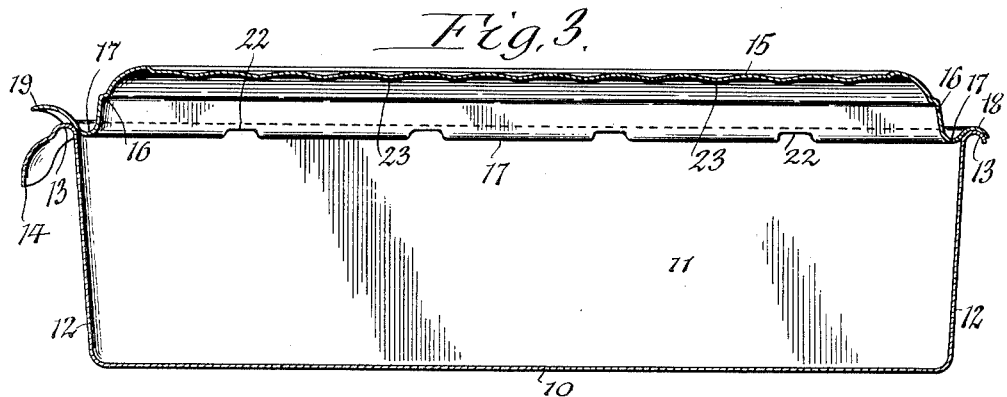
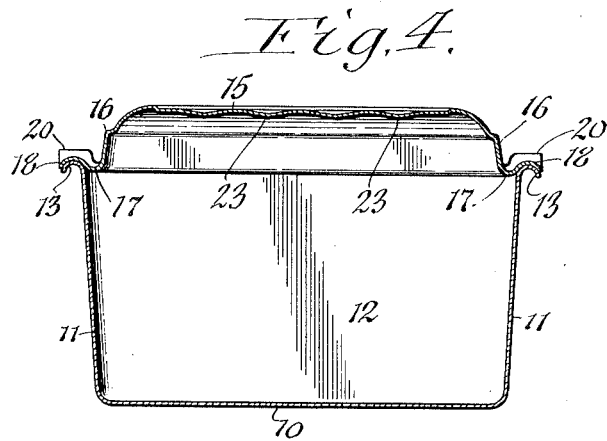
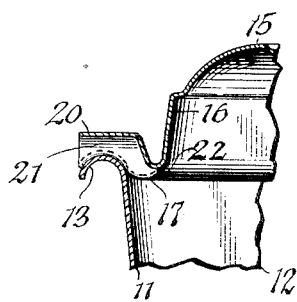
Inventor
Franklin G. Slagel
By Popp & Powers
Attorneys Patented Apr. 14, 1931

1,800,846

UNITED STATES PATENT OFFICE

FRANKLIN G. SLAGEL, OF BUFFALO, NEW YORK, ASSIGNOR TO FEDDERS MANUFACTURING COMPANY, INC., OF BUFFALO, NEW YORK, A CORPORATION OF NEW YORK

HUMIDIFIER FOR REFRIGERATORS

Application filed March 27, 1930. Serial No. 439,473.

This invention relates to a humidifier adapted to receive food and maintain the same in a moist and fresh condition while stored in the cooling compartment of a refrigerator.

It is the object of this invention to provide a humidifier of this character which is simple in construction and low in cost of manufacture and which provides an efficient circulation of air for preserving and cooling the food and also keeps the same moist and fresh without liability of the air ducts in the humidifier becoming clogged by the food and interfering with the circulation of the air.

In the accompanying drawings:

Figure 3 is a longitudinal section taken on line 3—3 Fig. 1.

Figure 4 is a cross section taken on line 4—4 Fig. 1.

Figure 5 is a fragmentary cross-section taken on line 5—5 Fig. 1.

In the following description similar characters of reference indicate like parts in the several views of the drawings.

Figure 1:
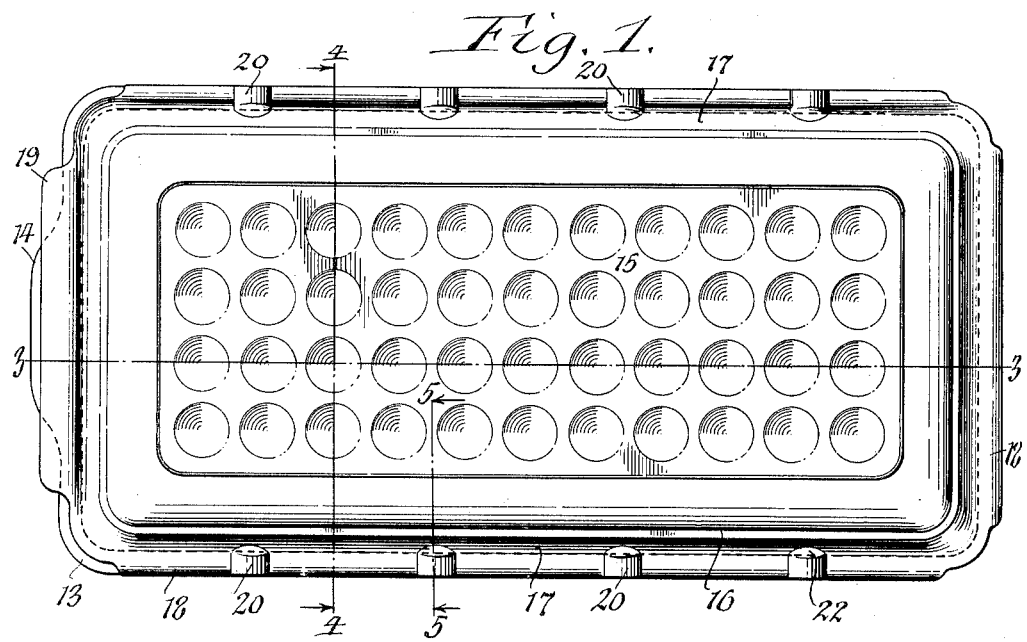
Figure 1 is a top plan view of my improved humidifier.
Figure 2:
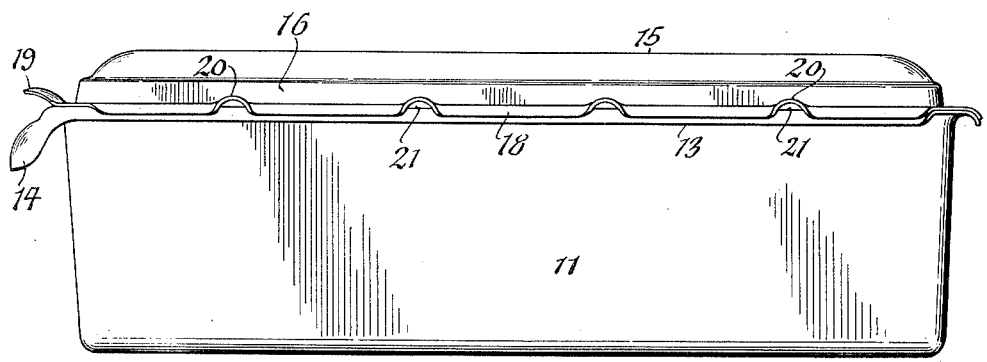
Figure 2 is a side elevation of the same.

The humidifier consists generally of a hollow body or pan which is adapted to receive the food to be stored in the refrigerator and a cover removably mounted on the top of the pan for protecting the contents.

The pan is preferably made of enameled sheet metal to form a bottom 10, two upright longitudinal side walls 11, 11, two transverse end walls 12, 12, a circumferential ledge 13 arranged at the upper edge of said walls and curved upwardly, outwardly and downwardly, and a handle 14 on the ledge of one of said end walls.

The cover is also preferably constructed of enameled sheet metal to form a crown 15, a circumferential flange 16 projecting downwardly from the margin of the crown, a downwardly deflected bead or gutter 17 arranged circumferentially at the lower edge of the flange 16 and adapted to extend downwardly into the pan along the inner side of the ledge thereof, and a circumferential rim 18 which curves upwardly, outwardly and downwardly from said gutter or bead and rests on the upper side of the ledge on the upper edge of the pan and is provided at one end of the cover with a handle 19.

By means of this construction water of condensation running down the inner side of the cover flange will drip from the lowermost part of the bead 17 and into the pan or onto the contents therein, thereby maintaining the moisture within the container and preserving the contents therein.

Circulation of air into and out of the humidifier is possible through vent ducts which are preferably formed between the cover and the pan by deflecting the metal on the marginal part of the cover upwardly along transverse lines at suitable intervals in order to produce transverse crimps 20, each of which extends from the flange of the cover across the bead and rim thereof and provides a transverse air duct 21 between the concave underside of the respective crimp and the adjacent ledge portion of the pan.

This form of air ducts or vent openings can be produced on the cover without additional cost and without weakening the cover, and as these ducts or openings are arranged on the underside of the rim and drip bead the same cannot become clogged or obstructed by the contents of the pan, thereby always admitting air into the humidifier for keeping the contents moist and fresh.

In order to prevent any water of condensation from creeping outwardly along the concave side of each crimp and also to further guard against the air ducts becoming obstructed by any vegetables or other food which otherwise might be placed across the inner ends of the air ducts, each of the crimps has the inner end of its summit bent or deflected downwardly to form a depending nib 22 within the side wall of the pan which extends below the upper side of the pan ledge, as shown in Fig. 5. Any water of condensation flowing down the inner side of the cover flange at the inner end of the crimps 20 drips off from the lower ends of the nibs 22 at these points and into the interior of the pan or onto the contents thereof, thereby retaining the moisture in the humidifier and keeping the contents in fresh condition.

By extending the nibs 22 downwardly below the top of the pan ledge 13 these nibs also serve as guards which hold vegetables or the like within the humidifier away from the inner ends of the air ducts and thus avoid obstructing the same, thereby insuring the entrance of air for keeping the contents of the humidifier fresh.

On the underside of the crown of the cover the same is provided with a plurality of downwardly projecting nibs 23 which receive the water of the vapor which condenses on the crown of the cover and from the lower pointed ends this water again drips back into the pan on the contents thereof and thereby retains the moisture in the pan and preserves the contents more effectively than if this moisture were discharged to the exterior of the humidifier.

As a whole this humidifier is exceedingly simple in construction, it contains no parts which are liable to become clogged, and the same can be produced at low cost by means of inexpensive tools.

It will be noted that in this construction the underside of the cover which constitutes the wet or moisture-coated surface of the humidifier is above the air vent passage, thereby retaining the moisture in the humidifier and keeping the vegetables and other food therein in a fresh conditon instead of permitting this moisture to escape freely and causing the vegetables to wilt and other food to become stale.

If desired the ledge 13 of the body may be utilized as hooks or hangers for supporting and sliding the humidifier on rods or the like within the cooling compartment of a refrigerator instead of resting the body on its bottom.

I claim as my invention:

1. A humidifier for refrigerators comprising a pan adapted to receive the food to be stored, and having an upper ledge; and a cover having its marginal part resting on said ledge and provided with air ducts in the marginal part resting on the ledge.

2. A humidifier for refrigerators comprising a pan adapted to receive the food to be stored and having an upper ledge; and a cover having a marginal rim resting on said ledge and also provided with air ducts each of which consists of a transverse groove in the underside of the marginal rim of said cover above the ledge of said pan.

3. A humidifier for refrigerators comprising a pan adapted to receive the food to be stored and having an upper ledge; and a cover having the underside of its marginal part provided with a downwardly opening circumferential groove which receives the ledge of said pan, and a circumferential bead projecting downwardly from the cover adjacent to the inner side of the said groove and along the inner side of the ledge of said pan.

4. A humidifier for refrigerators comprising a pan adapted to receive the food to be stored and having an upper ledge; and a cover having the underside of its marginal part provided with a downwardly opening circumferential groove which receives the ledge of said pan, a circumferential bead projecting downwardly from the cover adjacent to the inner side of said groove and along the inner side of the ledge of said pan, and air ducts having the form of transverse grooves arranged on the underside of the marginal part of said cover and extending across said circumferential groove and bead above the upper edge of said pan.

5. A humidifier for refrigerators comprising a pan adapted to receive the food to be stored and having a ledge at its upper edge which is curved upwardly and outwardly and downwardly; and a cover provided on its marginal rim with a circumferential downwardly opening groove resting on the curved ledge of said pan, and a circumferential bead arranged along the inner side of said circumferential groove and projecting downwardly along the inner side of the ledge of the pan; and transverse crimps deflected upwardly in the marginal part of said cover across the circumferential groove and bead thereof forming air ducts between the pan and cover.

6. A humidifier for refrigerators comprising a pan adapted to receive the food to be stored and having a ledge at its upper edge which is curved upwardly and outwardly and downwardly; and a cover provided on its marginal rim with a circumferential downwardly opening groove resting on the curved ledge of said pan, and a circumferential bead arranged along the inner side of said circumferential groove and projecting downwardly along the inner side of the ledge of the pan, and transverse crimps deflected upwardly in the marginal part of said cover across the circumferential groove and bead thereof forming air ducts between the pan and cover, and the inner ends of the summits of said crimps being depressed to form depending nibs from which the water of condensation leading thereto drips into the pan and the inner ends of the air ducts are guarded.

7. A humidifier for refrigerators comprising a pan adapted to contain the food to be stored, and a cover removably mounted on said pan and provided with air ducts and also provided on its underside with a plurality of downwardly projecting nibs from which the water of condensation drips into the pan.

In testimony whereof I hereby affix my signature.

FRANKLIN G. SLAGEL.